Oct. 25, 1938.  C. B. HOWARD  2,134,272
VEHICLE SIGNALING SWITCH
Filed April 9, 1937
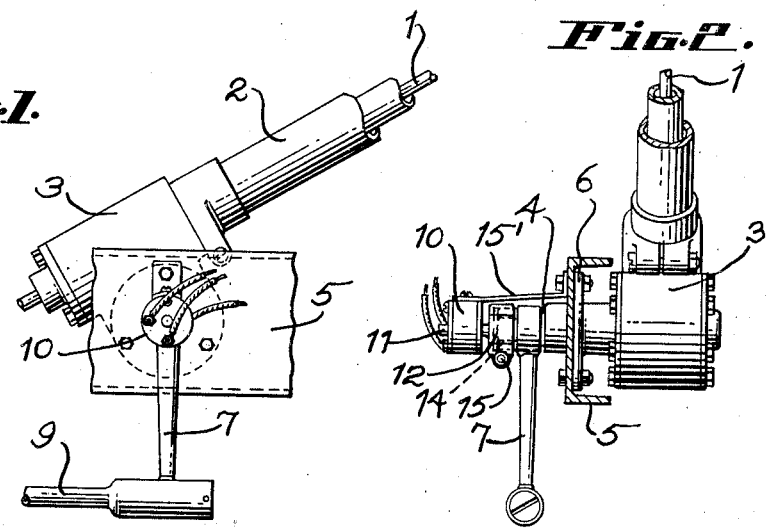
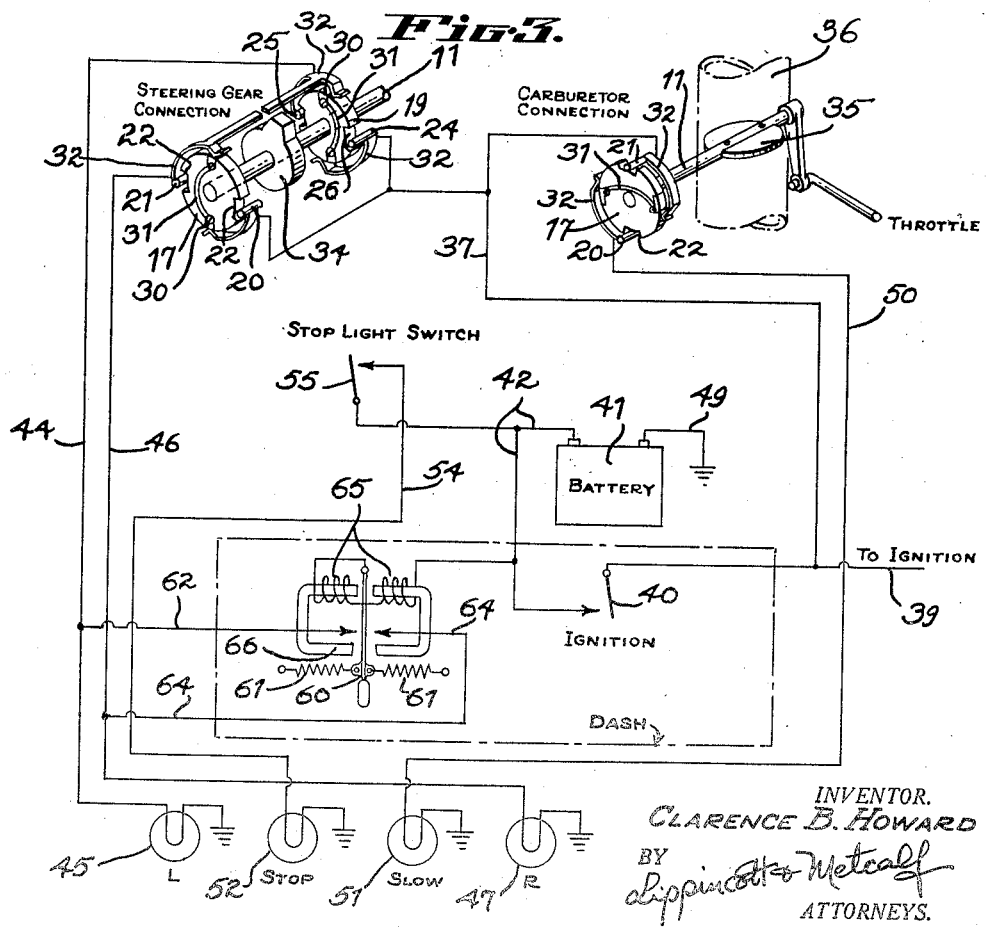
INVENTOR.
CLARENCE B. HOWARD
BY Lippincott & Metcalf
ATTORNEYS.

Patented Oct. 25, 1938

2,134,272

UNITED STATES PATENT OFFICE 2,134,272

VEHICLE SIGNALING SWITCH

Clarence B. Howard, Oakland, Calif., assignor to E. H. Kueffer

Application April 9, 1937, Serial No. 135,921

2 Claims. (Cl. 200—59)

My invention relates to vehicle signaling systems, and more particularly to a signaling system which will indicate to a following vehicle the direction in which the vehicle is about to turn, the direction in which it does turn, whether the vehicle is being accelerated or decelerated, or whether the brakes are being applied to effect a stop.

This application is a continuation in part of my prior application entitled "Vehicle direction indicator", Serial No. 127,112, filed February 23, 1937, and utilizes in its preferred form the switch disclosed and claimed in my prior application entitled Vehicle signal switch, Serial No. 124,863, filed February 9, 1937.

In the first listed prior application, above referred to, I have described a direction indicating switch applied to the steering gear of a vehicle so that movement of the steering gear will cause the switch to selectively open and close left and right signal circuits in order that following vehicles may tell whether or not the first vehicle is about to turn. I have found, however, that it is of great advantage for the operator of the vehicle to be able to manually indicate to a following vehicle the direction he intends to pursue before he actually turns the steering gear to make the turn, and the present invention is directed toward a switch and circuit therefor which will allow the operator to manually set up an indication of his intended direction together with automatic means for resetting the manual control to a neutral position after the turn has been started.

Other objects of my invention are: To provide a direction indicating switch that may be applied directly to the quadrant arm axle of a steering gear; to provide a vehicle direction indicating switch and means for removably attaching the switch to the steering gear of a vehicle; to provide a means and method of indicating the direction a vehicle will turn; and to provide a complete signaling system for a vehicle such as an automobile.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

Referring to the drawing:

Figure 1 is a side view of a steering gear having the switch of my invention attached thereto.

Figure 2 is a view partly in section and partly in elevation taken in a plane at right angles to the plane of Figure 1.

Figure 3 is a circuit diagram showing one preferred circuit giving complete indication of the direction of acceleration and deceleration, and brakes.

The invention depends upon the use of a switch which will change the circuital connection upon rotation of a shaft, the preferred switch operating mechanism being frictionally rotated by the shaft and prevented from further movement after a predetermined arc of rotation has been achieved. In this manner the shaft may rotate through any desired arc, circuital connections being changed only on change of direction of rotation of the shaft.

While I intend to describe my invention as utilizing the switches described and claimed in my above mentioned applications, it will be obvious to those skilled in the art that my invention is not limited to the use of those particular types of switches, and that any switch changing circuital connections, upon change of direction of shaft rotation, will be deemed full equivalents.

The broader aspects of my invention may be more fully understood by direct reference to the figures illustrating a preferred embodiment.

In Figure 1, a vehicle steering column 1 is enclosed in the usual protective tube 2, and enters a steering gear casing 3. The rotation of the steering column through the medium of the usual steering gears will rotate a quadrant axle 4, usually projecting outside of the vehicle frame 5, the casing being attached in certain instances to the frame by a flange 6. The quadrant axle has mounted thereon a quadrant arm 7 which is linked to the front wheels of the vehicle by drag link 9 attached to the end of the arm.

A preferred form of switch assembly comprises an outer casing 10 and a central axle 11. The switch mechanism is preferably operated by change in the rotation of the central axle. I prefer, therefore, to attach the switch axle to the quadrant axle by providing the switch axle with a female member 12, having an inner surface formed to roughly fit the usual quadrant arm retaining nut 14 which is mounted on the outer end of the quadrant axle. This female member is placed over the nut and firmly locked thereon by a locking bolt 15. I have found that the majority of commercial automobiles on the market are equipped with only two sizes and shapes of retaining nuts. Therefore, with only two female members, my switch may be attached to the majority of modern automobiles. I have found, however, that certain quadrant arm axles are hollow, and in this case I may desire to insert a fitting in the hollow axle to which the switch axle 11 may be attached.

Irrespective of how the switch axle is attached to the quadrant arm axle, I prefer to have the two of them in coaxial relation so that the switch axle rotates directly with the quadrant arm axle. I also prefer to prevent the case from rotating, and while this may be accomplished in a number of different manners, one way I have found satisfactory is to extend a stabilizing link 15' from the casing to the frame. It may be seen, therefore, that the entire switch mechanism may easily be removed for replacement or service by removing the stabilizing link from the frame or the case and loosening the locking bolt 15, whereupon the entire switch assembly may be removed.

A preferred switch herein utilized is the switch described by me in application entitled "Vehicle signal switch", Serial No. 124,863, supra. This switch is shown in perspective, without its case, in Figure 3. The parts have been spaced further than would be customary in practice, for ease of illustration. The switch axle 11 has mounted thereon a pair of contact discs 17 and 19. These contact discs are frictionally driven by switch axle 11, and are limited in their arc of rotation by stop pins 20 and 21 operating in notches 22 in contact disc 17, and by stop pins 24 and 25 operating in notches 26 in contact disc 19. The stop pins are usually stabilized by being attached to the case, which is not shown in this drawing. Each disc is provided with a pair of opposite moving contacts 30 connected by electrical links 31. Each stop pin carries a brush 32 bearing against the periphery of the contact discs at diametrically opposite positions. Either the brushes, the notches, or the stationary contacts of one disc are offset with relation to the other disc, so that when the discs are rotated in one direction contact is made between the brushes bearing on one disc and broken between those on the other disc, thus opening or closing any external circuits that may be connected through the opposed brushes. As I desire that there be a central point where neither circuit will be closed I provide between the two discs a cam 34 positioned to bear against and lift one brush on each disc so that no circuit can be closed.

A very similar switch, but utilizing only one disc, is attached to the carburetor control, and preferably shaft 11 is made a continuation of the shaft of the butterfly valve 35 in an intake manifold 36, represented by broken lines. In this case, contact is broken by the rotation of the disc when the throttle is being opened, and is closed between the two brushes when the throttle is being closed.

For operation, the two lower brushes 32 of the steering gear switch are connected together and to a main power line 37. One brush of the carburetor switch is also connected to this same power line 37. Power line 37 is connected in parallel to ignition line 39, controlled by ignition switch 40, the latter being connected to battery 41 through battery lead 42. One of the other brushes of the steering gear switch, namely, the one on the disc which will close the circuit when the steering gear axle is rotated to the left, is connected through left lamp wire 44 to a left indicator lamp 45, the other terminal of the lamp being grounded. The remaining brush on the other contact disc is led into a right indicator connection 46, the latter passing through a right indicator lamp 47 and thence to ground. The battery is grounded in the usual manner through ground connection 49. The other brush of the carburetor switch is connected through acceleration lamp connection 50 to the acceleration lamp 51, and thence to ground.

The circuit as described so far will operate to light the left lamp 45 when the vehicle is turning left, the right lamp 47 when the vehicle is turning right. When the vehicle is proceeding straight ahead cam 34 lifts both top brushes of the steering gear switch from the periphery of the discs and neither lamp will light. Any leeway desired may be obtained in this manner by changing the contour of the cam. Simultaneously the acceleration lamp 51 will light whenever the throttle is closing to decelerate. At the same time, I prefer to utilize the customary stop light 52, connected by stop light connection 54 to the customary stop light switch 55, the latter being connected to the main battery lead 42.

As far as I have described, however, there is no provision made for the manual lighting of either the left or right indicator lamp. This manual operation is provided by the use of a magnetic retaining switch comprising a pivoted switch arm 60, maintained in a central position by opposed springs 61. When the switch is moved to the left, connection will be made between the arm and the left indicator lamp through left manual connection 62. When the switch is thrown to the right contact will be made by the arm to right lamp wire 64. I prefer to energize the arm from battery lead 42 through a holding coil 65 wound around a magnet having opposed pole pieces 66, one on each side of the switch arm, which may be of magnetic material. Thus, when the switch is thrown either to the right or left, current will flow through the holding coil and through the lamp. The magnet will be energized and the arm will stick in the position desired. As the movement of the manual arm 60 is to be made in advance of any turn of the vehicle, and preferably while the vehicle is proceeding straight ahead, neither one of the circuits through the left and right lamp are being energized through the steering gear switch because the cam 34 has opened both of the circuits. When, however, the cam is moved by starting the turn, as manually set up, connection will be made through the steering gear switch, thus short circuiting the current through holding coil 65, and allowing the switch arm 60 to move under the influence of springs 61 back to the central position again. Thus, after the turn has been started, the manual switch is automatically re-set to neutral position in order that the new direction may be set up thereon when and if desired.

I claim:

1. The combination with a vehicle steering mechanism having a steering column operatively rotating a laterally extending quadrant axle linked to the wheels of said vehicle, said quadrant axle terminating in a quadrant nut, of a direction indicating switch comprising a fitting surrounding said nut, means for clamping said fitting to said nut alone, a switch operating shaft attached to said fitting and extending coaxially with said quadrant axle, a rotating contact member rotated by said switch axle solely by frictional forces transmitted from said switch axle, means for limiting the rotation of said contact member, a stationary contact positioned to connect with said stationary contact at one limit of rotation of said contact member, and means for preventing said stationary contact from rotating with said axles.

2. The combination with a vehicle steering mechanism having a steering column operatively rotating, a laterally extending quadrant axle linked to the wheels of said vehicle, said quadrant axle terminating in a quadrant nut, of a direction indicating switch, comprising a fitting surrounding said nut, means for clamping said fitting to said nut alone, a switch operating shaft attached to said fitting and extending axially in alinement with said quadrant axle, contact supporting devices rotated by said shaft, a case mounted on said shaft and enclosing said contact supporting devices, a stationary contact mounted in said case and positioned to cooperate with said contact supporting devices to make and break a circuit, and means for preventing said case from rotating with said shaft.

CLARENCE B. HOWARD.